(12) United States Patent
Mori

(10) Patent No.: US 8,970,921 B2
(45) Date of Patent: Mar. 3, 2015

(54) IMAGE PROCESSING APPARATUS

(71) Applicant: Kosuke Mori, Handa (JP)

(72) Inventor: Kosuke Mori, Handa (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/094,326

(22) Filed: Dec. 2, 2013

(65) Prior Publication Data

US 2014/0153065 A1    Jun. 5, 2014

(30) Foreign Application Priority Data

Nov. 30, 2012    (JP) ................. 2012-263084

(51) Int. Cl.
*H04N 1/04*      (2006.01)
*H04N 1/00*      (2006.01)
*H04N 1/12*      (2006.01)
*H04N 1/203*     (2006.01)

(52) U.S. Cl.
CPC ....... *H04N 1/00588* (2013.01); *H04N 1/00623* (2013.01); *H04N 1/00806* (2013.01); *H04N 1/1215* (2013.01); *H04N 1/2034* (2013.01); *H04N 1/00551* (2013.01); *H04N 2201/0422* (2013.01)
USPC ............................ 358/474; 358/498; 358/473

(58) Field of Classification Search
USPC ......... 358/474, 473, 471, 498, 475, 509, 497, 358/496
See application file for complete search history.

(56) References Cited

U.S. PATENT DOCUMENTS

| | | | | |
|---|---|---|---|---|
| 4,098,458 A * | 7/1978 | Auchinleck | .................... | 235/475 |
| 5,905,248 A * | 5/1999 | Russell et al. | ............ | 235/462.15 |
| 7,204,408 B2 * | 4/2007 | Cato | .............................. | 235/375 |
| 7,617,985 B2 * | 11/2009 | van Os | .......................... | 235/475 |
| 8,134,756 B2 * | 3/2012 | Yoneda et al. | ................. | 358/474 |

FOREIGN PATENT DOCUMENTS

| | | |
|---|---|---|
| JP | 2005-31971 | 2/2005 |
| JP | 2012-184057 | 9/2012 |

* cited by examiner

*Primary Examiner* — Negussie Worku
(74) *Attorney, Agent, or Firm* — Merchant & Goud PC

(57) ABSTRACT

An image processing apparatus includes: a conveyer configured to convey a sheet; a first introducing part configured to introduce a first-type sheet toward the conveyer; a second introducing part configured to introduce a second-type sheet different from the first-type sheet toward the conveyer; a cover configured to be displaced between an open state, in which the second introducing part is opened, and a closed state, in which the first introducing part is opened and the second introducing part is closed; an image processor configured to perform image processing according to a sheet conveyed by the conveyer; and a controller, wherein in a case where the cover is in the closed state, the controller performs a first setting process to set a first image processing condition corresponding to image processing according to the first-type sheet.

13 Claims, 13 Drawing Sheets

FIG. 6

| | COVER | PLAIN SHEET | CARD | OPERATION OF CONTROLLER |
|---|---|---|---|---|
| FIRST PATTERN | OPEN STATE | NON-EXISTENCE | - | NOTIFY THAT PLAIN SHEET IS NOT INTRODUCED |
| SECOND PATTERN | CLOSED STATE | NON-EXISTENCE | NON-EXISTENCE | NOTIFY THAT CARD IS NOT INTRODUCED |
| THIRD PATTERN | OPEN STATE | EXISTENCE | - | PERFORM READING OF PLAIN SHEET |
| FOURTH PATTERN | CLOSED STATE | EXISTENCE | - | NOTIFY THAT PLAIN SHEET IS BEING INTRODUCED |
| FIFTH PATTERN | CLOSED STATE | NON-EXISTENCE | EXISTENCE | PERFORM READING OF CARD |

IMAGE PROCESSING APPARATUS

CROSS-REFERENCE TO RELATED APPLICATION

This application claims priority from Japanese Patent Application. No. 2012-263084 filed on Nov. 30, 2012, the entire subject matter of which is incorporated herein by reference.

TECHNICAL FIELD

This disclosure relates to an image processing apparatus having a plurality of introducing parts to introduce different kinds of sheets.

BACKGROUND

A technology provides a sheet detecting sensor for each introducing part in an image reading apparatus that has two introducing parts to introduce different kinds of sheets, and the image reading apparatus conveys and reads a sheet introduced from each introducing part and controls conveyance of a sheet according to the detection states of the sensors.

SUMMARY

In a case of performing image processing on sheets, such as reading of sheets, appropriate image processing conditions are different depending on the kinds of sheets. In a case of a small sheet, for example, a card, when reading is performed with the maximum readable size, wide margins are produced in an image which is represented by image data. Accordingly, it can be said that it is appropriate to set a small read range in a case of reading a small sheet. Meanwhile, it is appropriate to set a wider read range in a case of reading a relatively large sheet, as compared to a case of reading a small sheet.

However, when a user needs to set image processing conditions according to the kinds of sheets, the user should set image processing conditions according to the kinds of sheets whenever image processing is performed, which is a trouble of the user.

This disclosure discloses at least a technology for setting image processing conditions according to the kinds of sheets in an image processing apparatus having a plurality of introducing parts to introduce different kinds of sheets, while suppressing the trouble of a user.

An image processing apparatus of this disclosure comprises: a conveyer configured to convey a sheet; a first introducing part configured to introduce a first-type sheet toward the conveyer; a second introducing part configured to introduce a second-type sheet different from the first-type sheet toward the conveyer; a cover configured to be displaced between an open state, in which the second introducing part is opened, and a closed state, in which the first introducing part is opened and the second introducing part is closed; an image processor configured to perform image processing according to a sheet conveyed by the conveyer; and a controller. In a case where the cover is in the closed state, the controller performs a first setting process to set a first image processing condition corresponding to image processing according to the first-type sheet.

According to the above described image processing apparatus, in the case where the cover is in the closed state, the first introducing part is open while the second introducing part is being covered by the cover. That is, in the case where the cover is in the closed state, it will be determined that it is too difficult to perform reading of the second type sheet. In this case, according to the above described image processing apparatus, the first image processing condition corresponding to the first-type sheet is set. Accordingly, at least in the case where the cover is in the closed state, a user does not need to set an image processing condition according to the kind of a sheet.

Therefore, according to the above described image processing apparatus, it is possible to set image processing conditions according to the types of sheets in an image processing apparatus having a plurality of introducing parts to introduce different kinds of sheets while suppressing the trouble of a user.

Also, the technology disclosed by this disclosure can be implemented in a variety of forms such as an image processing program, an image processing method, and a recording medium having the image processing program recorded thereon.

According to the above described image processing apparatus, it is possible to set an image processing condition according to the kind of a sheet in an image processing apparatus having a plurality of introducing parts to introduce different kinds of sheets while suppressing the trouble of a user.

BRIEF DESCRIPTION OF THE DRAWINGS

The foregoing and additional features and characteristics of this disclosure will become more apparent from the following detailed descriptions considered with the reference to the accompanying drawings, wherein:

FIG. 6 is a table illustrating patterns of detection results of sensors;

DETAILED DESCRIPTION

<First Illustrative Embodiment>

(1) Image Reading Apparatus

An image reading apparatus 1 according to a first illustrative embodiment will be described with reference to FIGS. 1 to 10. The image reading apparatus 1 is configured to be able to read not only sheets of A4, B5, and the like, but also sheets such as a cash card, a credit card, a business card, and a certificate. The image reading apparatus 1 is an example of an image processing apparatus.

In the following description, a sheet of A4, B5, or the like will be referred to as a plain sheet, and a card-sized sheet will be referred to as a card. A card is an example of a first-type sheet. Also, a plain sheet is an example of a second-type sheet.

(1-1) Appearance of Image Reading Apparatus

Figure 1:
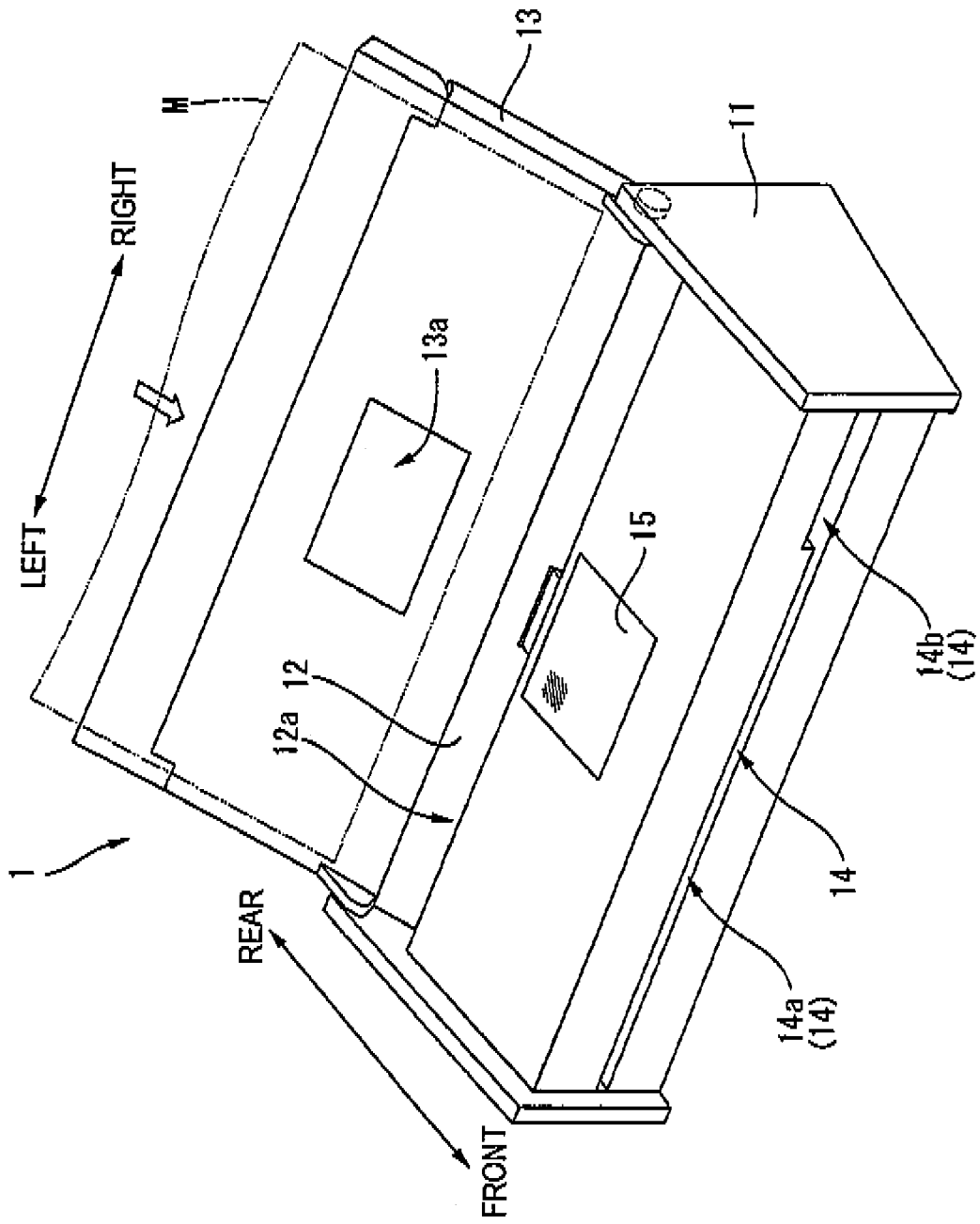
FIG. 1 is a perspective view illustrating the appearance of an image reading apparatus according to a first illustrative embodiment (the cover is in an open state)
Figure 2:
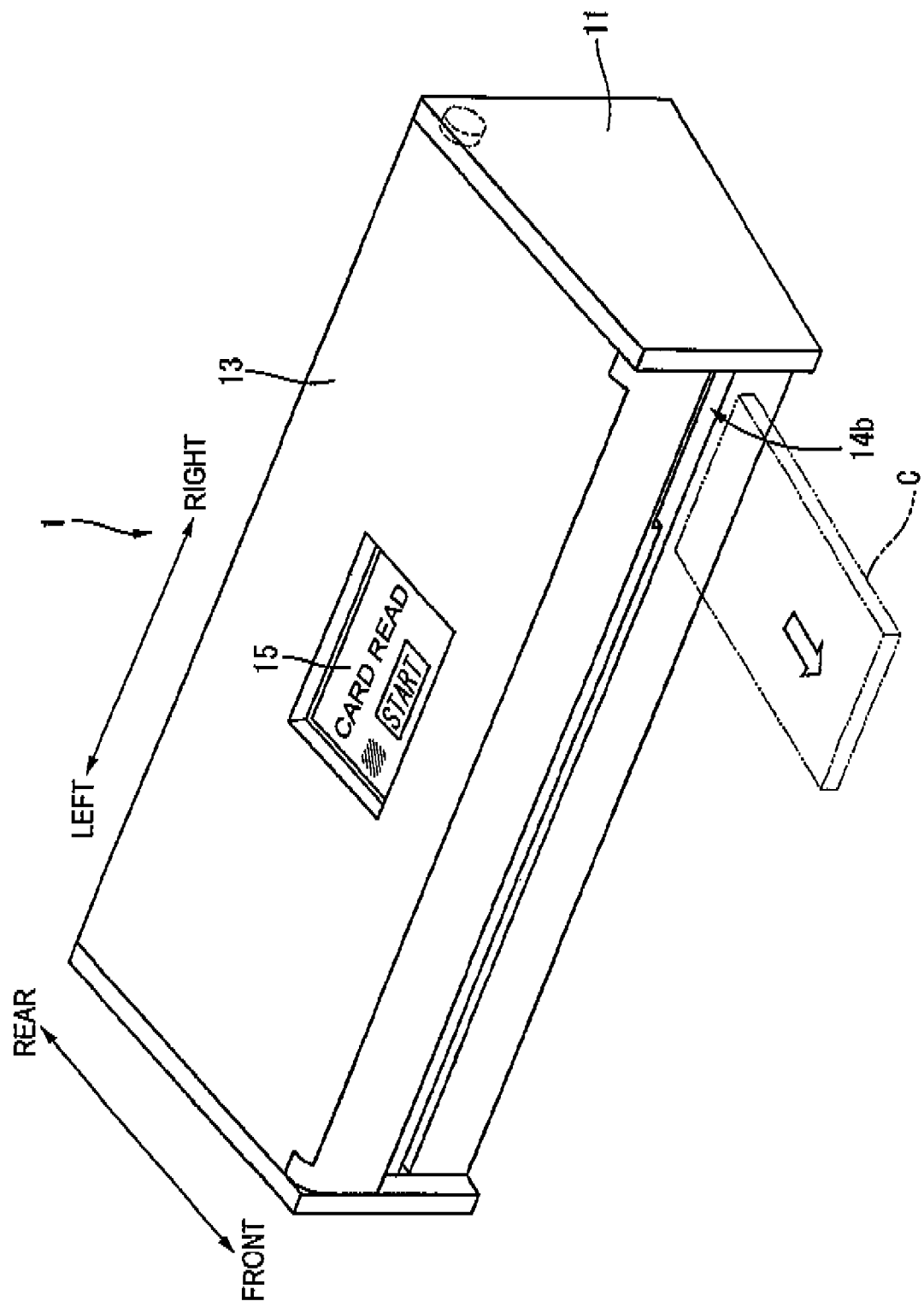
FIG. 2 is a perspective view illustrating the appearance of the image reading apparatus (the cover is in a closed state)
Figure 3:
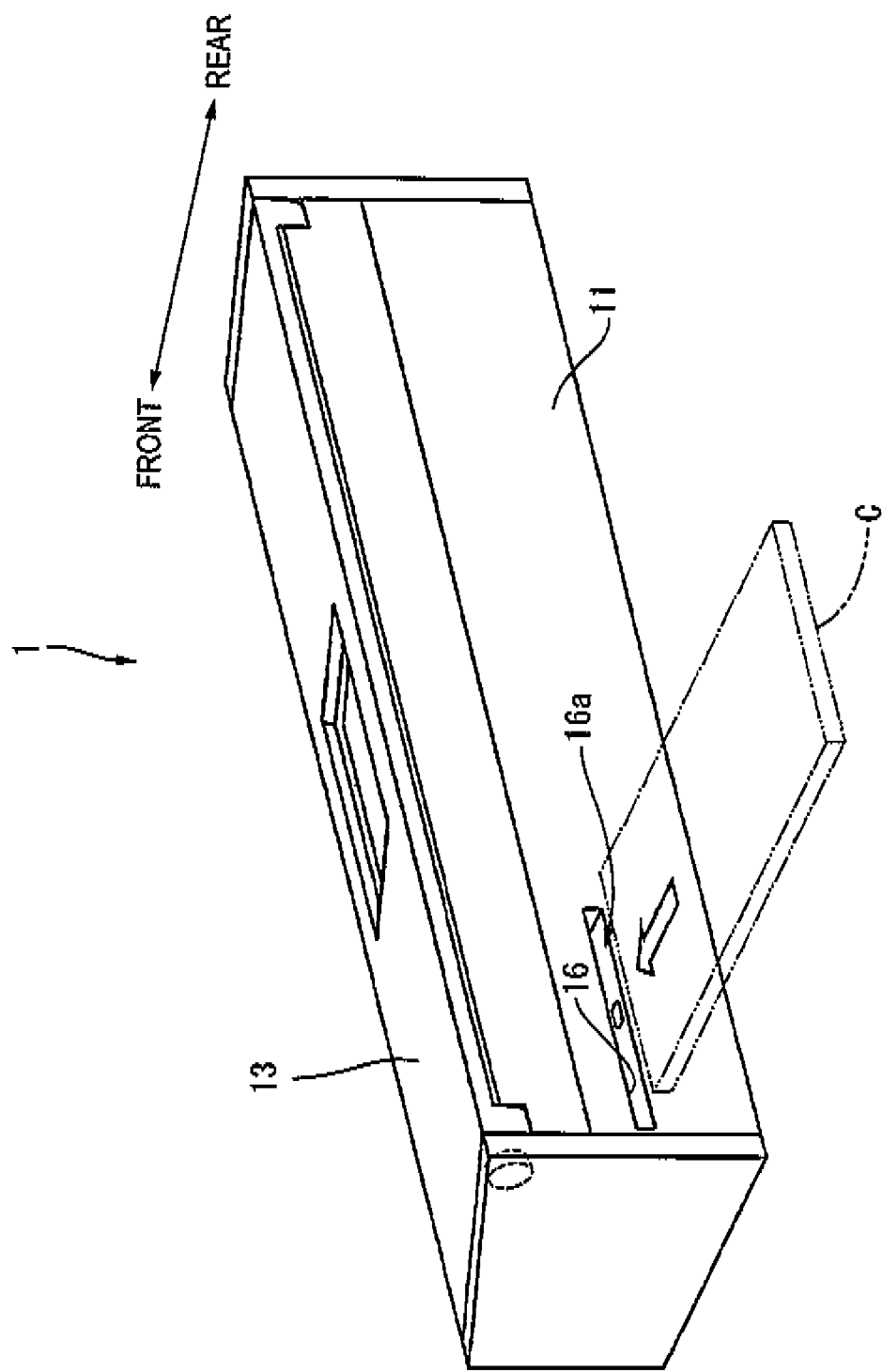
FIG. 3 is a perspective view illustrating the appearance of the image reading apparatus (the cover is in a closed state)

As shown in FIGS. 1 to 4, a housing 11 of the image reading apparatus 1 is formed in a roughly box shape. As shown in FIG. 1, on a rear side of an upper face of the housing 11, a second introducing part 12 is provided to extend in a left-right direction. The second introducing part 12 is provided to introduce a plain sheet M. As shown in FIG. 3, on the right side of the rear face of the housing 11, a first introducing part 16 is provided. The first introducing part 16 is provided to introduce a card C. As shown in FIG. 1, on the front side of the housing 11, a discharging unit 14 is provided to extend the left-right direction. Also, on the top face of the housing 11, an operation unit 15 is provided. A user can operate the operation unit 15, thereby setting a sheet reading-condition, or issuing a reading instruction, or performing other operations. At a cover 13, an opening 13a is formed to allow the user to operate the operation unit 15 even when the cover 13 is in the closed state.

At the second introducing part 12, a second introducing opening 12a is formed to introduce a plain sheet M into the housing 11 to read the plain sheet M.

The cover 13 is connected to the housing 11 such that the cover is rotatable between a closed state (see FIG. 2), in which the second introducing opening 12 is covered, a and an open state, the second introducing opening 12a is opened, as shown in FIG. 1. In a case where the cover 13 is in the open state, the cover 13 is inclined at a predetermined angle from the closed state, so as to function as a sheet tray for mounting plain sheets M. The plain sheet M introduced from the second introducing opening 12a is read by an image reading unit 30 (see FIG. 4) and is discharged from a first discharge opening 14a of the discharging unit 14 of the front face of the housing 11, or from the first discharge opening 14a and a second discharge opening 14b.

As shown in FIG. 2, when the cover 13 is displaced to be the closed state, the top face of the housing 11 is covered, whereby the second introducing opening 12a is covered. Therefore, in a case where the cover 13 is in the closed state, it is too difficult to introduce any plain sheet M.

At the first introducing part 16, a first introducing opening 16a is provided to introduce a card C into the housing 11 and to read the card C. The first introducing opening 16a is not covered even when the cover 13 becomes the open state. That is, even when the cover 13 becomes the open state, the first introducing part 16 is open.

The card C introduced from the first introducing opening 16a is read by the image reading unit 30 (see FIG. 4), and is discharged from the second discharge opening 14b of the discharging unit 14 of the front face of the housing 11. The first discharge opening 14a and the second discharge opening 14b have a common portion.

(1-2) Internal Configuration of Image Reading Apparatus

Figure 4:
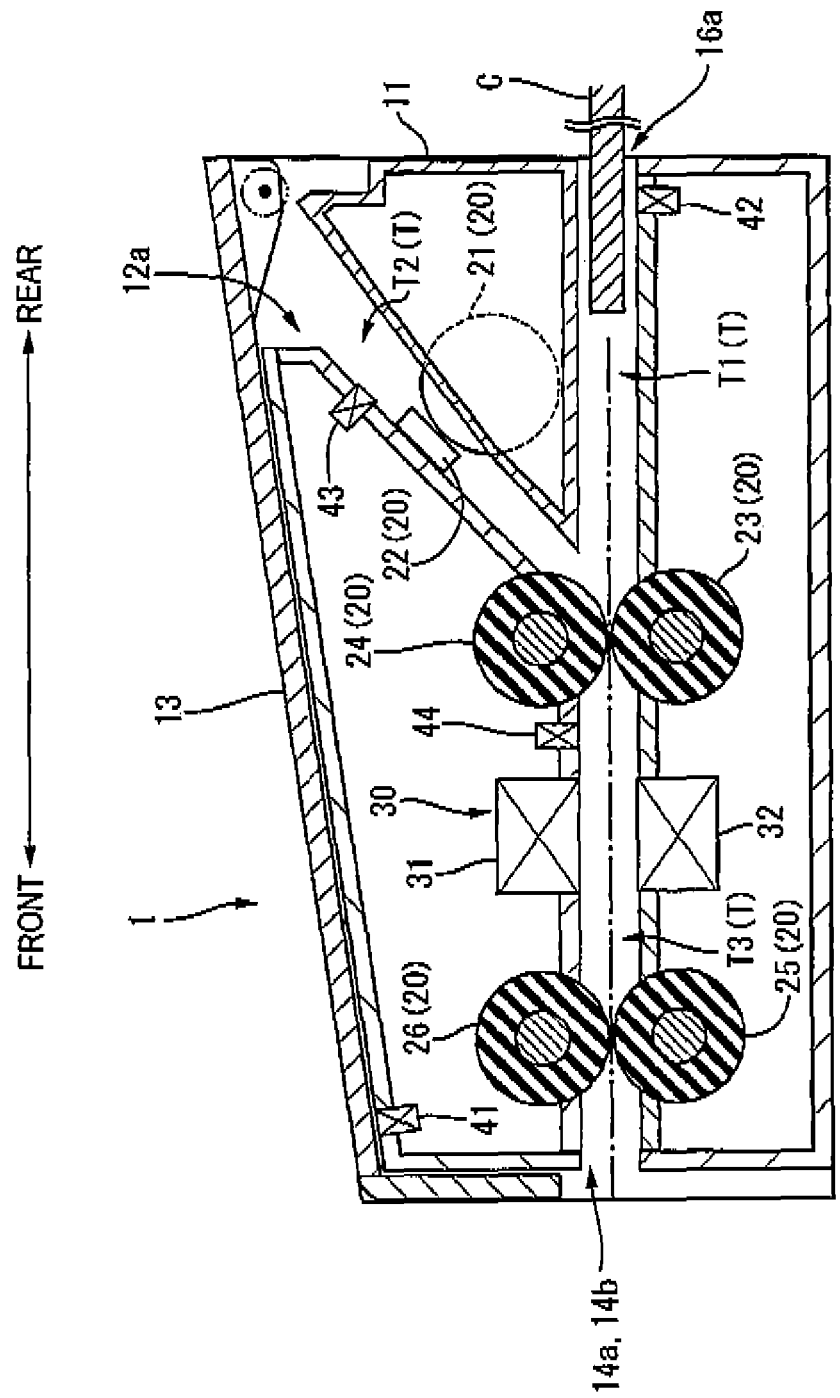
FIG. 4 is a block diagram simply illustrating the internal configuration of the image reading apparatus.

Hereinafter, the internal configuration of the image reading apparatus 1 will be described with reference to FIG. 4. Inside the housing 11 of the image reading apparatus 1, a conveyer 20, the image reading unit 30, a cover sensor 41, a card sensor 42, a plain sheet sensor 43, a rear sensor 44, and so on are accommodated. Also, inside the housing 11, a conveyance path T is formed for conveying cards C and plain sheets M.

The conveyance path T is configured by a first conveyance path T1 for conveying the card C, a second conveyance path T2 for conveying plain sheets M, and a common conveyance path T3 where the first conveyance path T1 and the second conveyance path T2 join together. As shown in FIG. 4, the first conveyance path T1 and the second conveyance path T2 join together on the upstream side with respect to the image reading unit 30. Also, as shown in FIG. 4, the first conveyance path T1 and the common conveyance path T3 form one linear conveyance path. This is for conveying the card C that is hard to bend, such as a cash card and a credit card.

The conveyer 20 is configured to include a introducing roller 21, a separating pad 22, a conveying roller 23, a driven roller 24 that is driven to rotate by the conveying roller 23, a conveying roller 25, a driven roller 26 that is driven to rotate by the conveying roller 25, a stepping motor (not shown), a transmitting mechanism (not shown) that transmits the torque of the stepping motor to the introducing roller 21, the conveying roller 23, and the conveying roller 25 described above, and so on.

The conveyer 20 conveys the card C introduced from the first introducing opening 16a, along the first conveyance path T1 and the common conveyance path T3 and conveys the plain sheet M introduced from the second introducing opening 12a, along the second conveyance path T2 and the common conveyance path T3.

The separating pad 22 and the introducing roller 21 are provided on the second conveyance path T2. The separating pad 22 is pressed toward the introducing roller 21 by a pressing member (not shown) such as a spring. The introducing roller 21 cooperates with the separating pad 22 to separate plain sheets M introduced from the second introducing opening 12a, one by one and conveys the plain sheet M toward the common conveyance path T3.

The conveying roller 23 and the driven roller 24 are disposed on the upstream side with respect to the image reading unit 30 on the common conveyance path T3. The conveying roller 25 and the driven roller 26 are disposed on the downstream side with respect to the image reading unit 30 on the common conveyance path T3.

Here, in order to read a card C by the image reading unit 30, the user needs to insert the card C from the first introducing opening 16a and pushes the card C until the card C is nipped by the conveying roller 23 and the driven roller 24. This is because unless the card C is nipped by the conveying roller 23 and the driven roller 24, even when the conveyer 20 is rotated, it is too difficult to convey the card C.

The image reading unit 30 includes a first reading unit 31 and a second reading unit 32. The first reading unit 31 reads one face of a sheet while the sheet is being conveyed in the common conveyance path T3. The second reading unit 32 is disposed on the opposite side of the common conveyance path T3 to the first reading unit 31 and reads the other face of the corresponding sheet while the sheet is being conveyed in the common conveyance path T3. Also, the first reading unit and the second reading unit may be disposed to be out of alignment in the sheet conveyance direction. The image reading unit 30 is an example of an image processor.

The first reading unit 31 and the second reading unit 32 have substantially the same configuration. Therefore, the first reading unit 31 will be described as an example. The first reading unit 31 is configured to include a light source for irradiating a sheet being in the common conveyance path T3, a linear image sensor having a plurality of light receiving elements arranged linearly in a direction perpendicular to the plane of paper of FIG. 4, an optical system that forms the optical image of the sheet irradiated by the light source, on the light receiving elements of the linear image sensor, and so on.

The light source may be an LED light source of three colors, that is, Red (R), Green (G), and Blue (B), or may be a white light source using a cold cathode fluorescent lamp (CCFL) or the like. In the present embodiment, LED light sources of three colors R, G, and B are used. The linear image sensor may be a CCD sensor, or may be a CMOS sensor. The optical system may be a same magnification optical system, or may be a reduction magnification optical system.

The cover sensor 41 is a sensor which a controller 50 (to be described below) (see FIG. 5) uses to detect the open-and-closed state of the cover 13. As the cover sensor 41, it is possible to use, for example, a mechanical switch that is pressed and thereby turning on when the cover 13 is closed, and is released from the pressing and thereby turning off when the cover 13 is opened. Alternatively, the cover sensor 41 may be a switch which is turned on by contact of a contact point of the cover (13) side and a contact point of the case (11) side when the cover 13 is closed, and is turned off by releasing from the contact of the contact points when the cover 13 is opened. Also, the cover sensor 41 is not limited to the above described configurations but may have any other configuration which the controller 50 can use to detect the open-and-closed state of the cover 13.

The card sensor 42 is a sensor for detecting existence of a card C. The card sensor 42 is disposed in the vicinity of the first introducing opening 16*a* on the first conveyance path T1. As the card sensor 42, it is possible to use, for example, a sensor which is pressed so as to be turned on by a card C when the card C is in the first conveyance path T1, and is not pressed so as to turned off by any card C when there is no card C in the first conveyance path T1. Also, the card sensor 42 is not limited to the above described configuration but may have any other configuration capable of existence of a card C. For example, the card sensor 42 may be a photoelectric sensor, an ultrasonic sensor, or any other sensor. The card sensor 42 is an example of a first sheet sensor.

The plain sheet sensor 43 is a sensor for detecting existence of a plain sheet M. The plain sheet sensor 43 is disposed on the upstream side with respect to the introducing roller 21 and the separating pad 22 on the second conveyance path T2. As the plain sheet sensor 43, it is possible to use a sensor having the same configuration as that of the card sensor 42. The plain sheet sensor 43 is an example of a second sheet sensor.

The rear sensor 44 is a sensor for detecting existence of a sheet such as a card C or a plain sheet M in the common conveyance path T3. The rear sensor 44 is disposed between the image reading unit 30 and the driven roller 24. The rear sensor 44 is used for the controller 50 to determine a timing to control the image reading unit 30 such that the image reading unit 30 starts reading each sheet, and a timing to control the image reading unit 30 such that the image reading unit 30 finishes reading the corresponding sheet. As the rear sensor 44, it is possible to use a sensor having the same configuration as that of the card sensor 42.

(1-3) Electric Configuration of Image Reading Apparatus

Figure 5:
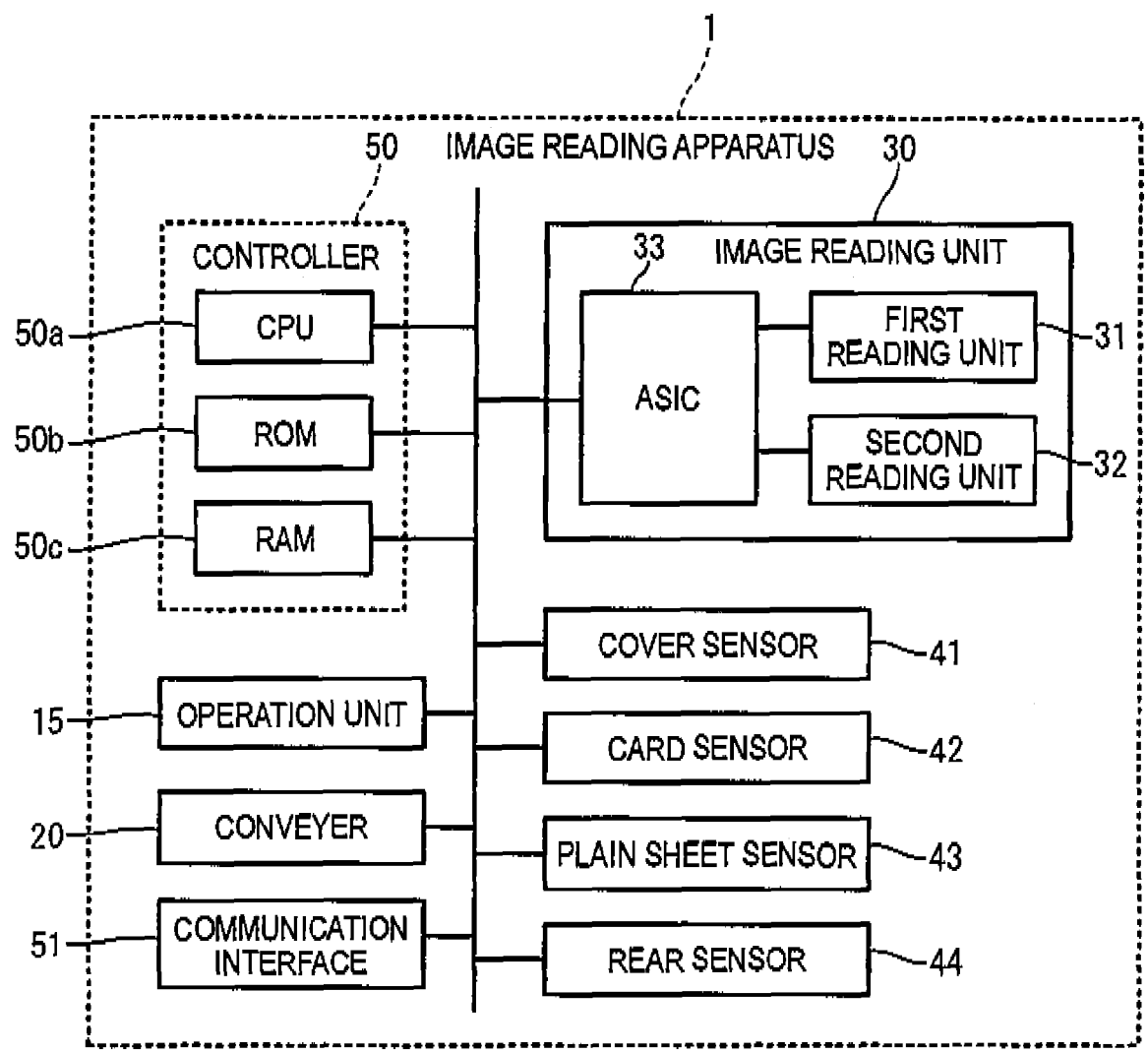
FIG. 5 is a block diagram simply illustrating the electrical configuration of the image reading apparatus.

Hereinafter, the electrical configuration of the image reading apparatus 1 will be described with reference to FIG. 5. The image reading apparatus 1 includes the controller 50, the operation unit 15, the conveyer 20, the image reading unit 30, a communication interface 51, the cover sensor 41, the card sensor 42, the plain sheet sensor 43, and the rear sensor 44. The configurations of the conveyer 20, the cover sensor 41, the card sensor 42, the plain sheet sensor 43, and the rear sensor 44 are as described above, and thus will not be described here.

The controller 50 is configured to include a CPU 50*a*, a ROM 50*b*, and a RAM 50*c*. The CPU 50*a* executes control programs stored in the ROM 50*b*, thereby controlling each unit of the image reading apparatus 1. The ROM 50*b* stores control programs to be executed by the CPU 50*a*, data, and so on. The RAM 50*c* acts as a main storage device which is usable for the CPU 50*a* to perform a variety of processes.

The image reading unit 30 includes an ASIC 33 and an Analog Front End (AFE) (not shown), in addition to the first reading unit 31 and the second reading unit 32 described above. Under control of the CPU 50*a*, the ASIC 33 controls the light sources, the linear image sensors, the stepping motor, and so on. The AFE is a circuit for performing processes such as gain adjustment and A/D conversion on an analog image signal output from each linear image sensor, and outputting a digital image signal. The ASIC 33 performs a variety of image processing such as gamma correction and shading compensation on each image signal output from the AFE, thereby generating image data having the concentrations of three colors R, G, and B for each pixel.

The image data generated by the image reading unit 30 may be transmitted to an external apparatus through the communication interface 51, or may be stored in a storage medium such as a removable memory removably installed in the image reading apparatus 1, or may be attached to an E-mail to be transmitted, or may be transmitted by fax.

The operation unit 15 is configured to include a display such as a liquid crystal display, a drive circuit for driving the display, a substantially transparent touch panel which covers the display face of the display, and so on. As described above, the user can operate the operation unit 15, thereby setting a reading-condition or inputting a reading instruction. The reading instruction is an example of a request for performing image processing. The operation unit 15 is an example of a request receiver, a display unit, and a change receiver.

The communication interface 51 is an interface for communication with an external apparatus such as a personal computer through a communication line such as universal serial bus (USB), a local area network (LAN), or the Internet.

(2) Reading-Conditions Corresponding to Kinds of Sheets

In order to control the image reading apparatus 1 such as the image reading apparatus 1 reads a sheet such as a plain sheet M or a card C, the user can operate the operation unit 52, thereby setting a reading-condition. A reading-condition means a combination of option values of read option items. Here, as the read option items, items "NUMBER OF COLORS", "RESOLUTION", "READ FACE", and "READ SIZE" will be described as examples. Examples of option values settable for each read option item will be shown below.

The item "NUMBER OF COLORS" may have any one of option values "COLOR" and "MONOCHROME". The item "RESOLUTION" may have any one of option values "300 dpi", "600 dpi", and "1200 dpi". The item "READ FACE" may have any one of option values "SINGLE SIDE" and "DUAL SIDE". The item "READ SIZE" may have any one of option values "CARD SIZE" and "PLAIN SHEET SIZE".

By the way, in a case of reading a card C, in general, the following reading-condition is set. That is, the item "NUMBER OF COLORS" is set to the option value "COLOR", and the item "RESOLUTION" is set to the option value "1200 dpi", the item "READ FACE" is set to the option value "DUAL SIDE", and the item "READ SIZE" is set to the option value "CARD SIZE".

The reason why the item "NUMBER OF COLORS" is set to the option value "COLOR" is that, in general, cards C have a tendency to be read in color. The reason why the item "RESOLUTION" is set to the option value "1200 dpi" is that in general, letters written on cards C are small and thus cards C have a tendency to be read at high resolution for making it easy for the user to recognize letters on images generated by reading the card C. The reason why the item "READ FACE" is set to the option value "DUAL SIDE" is that in general, cards C have information written on their front and back. Also, the reason why the item "READ SIZE" is set to the option value "CARD SIZE" is that when reading is performed with the option value "PLAIN SHEET SIZE", wide margins are produced in images which are represented by image data.

That is, it can be said that the above described reading-condition is appropriate in a case of reading a card C. In a case of reading a sheet of a kind for which an appropriate reading-condition is known as described above, when the controller 50 automatically sets the corresponding reading-condition, it is possible to reduce the trouble of the user to set the reading-condition.

Accordingly, the image reading apparatus 1 determines whether reading of a plain sheet M is to be performed or reading of a card C is to be performed, by a method to be described below, and automatically sets the above described reading-condition in a case where reading of a card C is to be performed. In the following description, the above described reading-condition is referred to as a card reading-condition. The card reading-condition is an example of a first image processing condition.

(3) Determination on Whether Reading of Plain Sheet is to be Performed or Reading of Card is to be Performed The determination on whether reading of a plain sheet M is to be performed, or reading of a card C is to be performed will be described with reference to FIG. 6. In the configuration of the image reading apparatus 1 according to the present embodiment, it will be not preferable to use only the card sensor 42 and the plain sheet sensor 43 to determine whether reading of a plain sheet M is to be performed, or reading of a card C is to be performed. The reason is that, in a case where the cover 13 is the open state as shown in FIG. 1, since both of the first introducing part 16 and the second introducing part 12 are open, for example, a case where a card C is inserted in the first introducing part 16 and a plain sheet M is introduced in the second introducing part 12 may occur, and in this case, it is difficult to determine which sheet the user wants to read.

Accordingly, the controller 50 uses not only the plain sheet sensor 43 and the card sensor 42 but also the cover sensor 41 to determine whether reading of a plain sheet M is to be performed, or reading of a card C is to be performed.

Now, differences between processes of the controller 50 depending on combinations of detection results of the cover sensor 41, the card sensor 42, and the plain sheet sensor 43 will be described with reference to FIG. 6. In FIG. 6, a symbol "-" represents that with respect to a corresponding pattern, detection of existence of a card C by the card sensor 42 is not performed. Specifically, in the present embodiment, in a case where the cover 13 is in the open state, detection of existence of a card C by the card sensor 42 is not performed. That is, only in a case where the cover 13 is in the closed state, the controller 50 controls the card sensor 42 such that the card sensor 42 detects existence of a card C.

(First Pattern in Which Cover is in Open State and There is No Plain Sheet)

In the case where the cover 13 is in the open state, the user can introduce a card C into the first introducing opening 16a and can also introduce a plain sheet M into the second introducing opening 12a. That is, in the case where the cover 13 is in the open state, the user can make a state where there are sheets introduced not only in the first introducing opening 16a but also in the second introducing opening 12a. However, when there are sheets introduced not only in the first introducing opening 16a but also in the second introducing opening 12a, the controller 50 cannot determine whether the user wants to read a plain sheet M or to read a card C.

Accordingly, in a case where the cover 13 is in the open state, the controller 50 determines to read a plain sheet M and not to read a card C. This is the configuration of the image reading apparatus 1 of the present embodiment. Also, a disclosure can be set such that reading of a card C is performed although the cover 13 is in the open state.

As described above, the image reading apparatus 1 according to the first illustrative embodiment does not perform reading of a card C in the case where the cover 13 is in the open state, and thus the image reading apparatus 1 will read a plain sheet M in a case of the first pattern.

However, in the case of the first pattern, there is no plain sheet M, and thus the controller 50 receives an OFF signal from the plain sheet sensor 43. Accordingly, the controller 50 controls the operation unit 15 such that the operation unit 15 displays a message representing that there is no plain sheet M introduced in the second introducing part 12, thereby notifying the user of the meaning of the message.

Also, in the first pattern, since the cover 13 is in the open state, the controller 50 controls the card sensor 42 such that the card sensor 42 does not detect existence of a card C.

(Second Pattern in Which Cover is in Closed State, and There is No Plain Sheet, and There is No Card)

In a case where the cover 13 is in the closed state, since it is too difficult to introduce a plain sheet M into the second introducing opening 12a, a possibility that the user wants to read a plain sheet M is low. Accordingly, in the case where the cover 13 is in the closed state, the controller 50 determines to perform reading of a card C.

Here, in the case where the cover 13 is in the closed state, a case where there is a plain sheet M introduced in the second introducing opening 12a will not occur, normally. However, the user may close the cover 13 while there is being a plain sheet M introduced in the second introducing opening 12a. Accordingly, in a case where the cover 13 is in the closed state, and there is no plain sheet M, the controller 50 determines to perform reading of a card C.

However, in the case of the second pattern, there is no card C introduced in the first introducing opening 16a, that is, the controller 50 receives an OFF signal from the card sensor 42. Therefore, the controller 50 controls the operation unit 15 such that the operation unit 15 displays a message representing that there is no card C introduced in the first introducing opening 16a, thereby notifying the user of the meaning of the message.

(Third Pattern in Which Cover is in Open State and There is Plain Sheet)

In this case, the controller 50 determines to read the plain sheet.

Also, in the third pattern, since the cover 13 is in the open state, the controller 50 controls the card sensor 42 such that the card sensor 42 does not detect existence of a card C.

(Fourth Pattern in Which Cover is in Closed State and There is Plain Sheet)

As described above, the user may close the cover 13 while there is being a plain sheet M introduced in the second introducing opening 12a. In a case where there is a plain sheet M, that is, in a case where an ON signal is received from the plain sheet sensor 43, the controller 50 does not perform reading of a card C even when the cover 13 is in the closed state.

In this case, the controller 50 controls the operation unit 15 such that the operation unit 15 displays a message representing that there is a plain sheet M introduced in the second introducing part 12, thereby notifying the user of the meaning of the message.

Also, in the fourth pattern, since the cover 13 is in the closed state, but there is a plain sheet M introduced in the second introducing part 12, the controller 50 controls the card sensor 42 such that the card sensor 42 does not detect existence of a card C.

(Fifth Pattern in which Cover is in Closed Stated, and There is No Plain Sheet, and There is Card)

In a case where the cover 13 is in the closed state, and there is a card C, that is, in a case where an ON signal is received from the card sensor 42, the controller 50 determines to read the card C.

(Other Patterns)

There may be patterns other than the above described first to fifth patterns. However, in cases of patterns other than the first to fifth patterns, reading is not performed, and those cases will not be described.

(4) Reading Control Process

Figure 7:
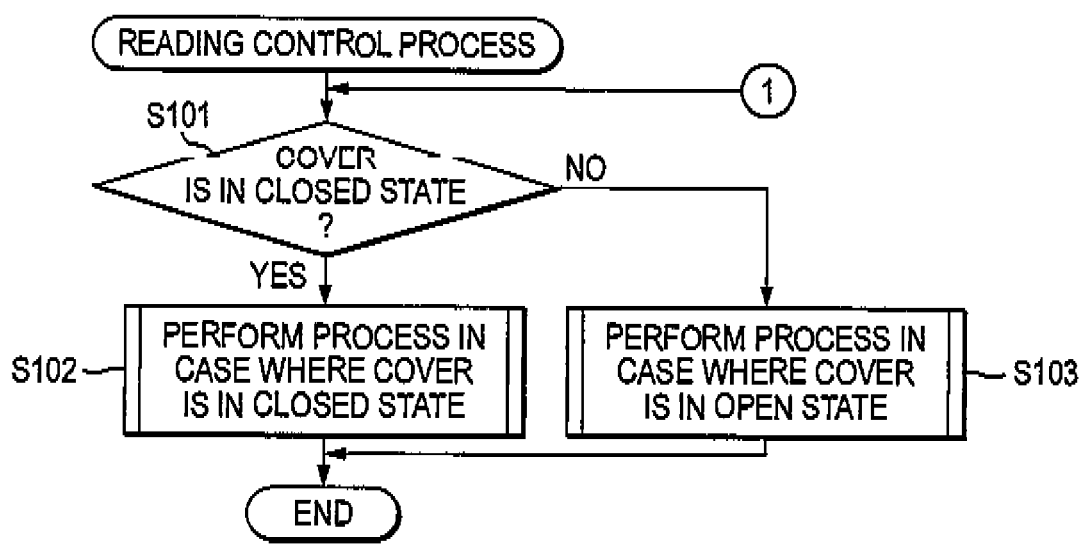
FIG. 7 is a flow chart illustrating a reading control process.

Hereinafter, a reading control process of the controller 50 will be described in more detail with reference to FIG. 7. The reading control process starts when the user operates the operation unit 15 so as to input a reading instruction.

Here, in the first illustrative embodiment, when the user wants to read a plain sheet M, the user operates the operation unit 15 so as to set a reading-condition for reading the plain sheet and then input a reading instruction, and when the user wants to read a card C, the user operates the operation unit 15 so as to input a reading instruction without setting a reading-condition.

In Step S101, the controller 50 detects the open-and-closed state of the cover 13 by the cover sensor 41. In a case where the cover 13 is in the closed state, the controller 50 proceeds to Step S102. Meanwhile, in a case where the cover 13 is in the open state, the controller 50 proceeds to Step S103.

In Step S102, the controller 50 performs a process in the case where the cover 13 is in the closed state.

In Step S103, the controller 50 performs a process in the case where the cover 13 is in the open state.

(4-1) Process in Case Where Cover is in Closed State

Hereinafter, the process in the case where the cover is in the closed state will be described with reference to FIG. 8.

In Step S201, the controller 50 performs detection of existence of a plain sheet M by the plain sheet sensor 43. In a case where there is no plain sheet M, the controller 50 proceeds to Step S202. Meanwhile, in a case where there is a plain sheet M (the case of the fourth pattern of FIG. 6), the controller 50 proceeds to Step S212.

In Step S202, the controller 50 performs detection of existence of a card C by the card sensor 42. In a case where there is a card C (the case of the fifth pattern of FIG. 6), the controller 50 proceeds to Step S203. Meanwhile, in a case where there is no card C (the case of the second pattern of FIG. 6), the controller 50 proceeds to Step S212.

In Step S203, the controller 50 performs a pre-feeding process of the card. The pre-feeding process of the card is a process of introducing the card C up to a position where the card C is detected by the rear sensor 44.

However, as described above, in a case where the card C has not been pushed such that the card C is nipped by the conveying roller 23 and the driven roller 24, it is too difficult to convey the card C. Therefore, in this case, it is determined that it is too difficult to introduce the card by the pre-feeding process of the card C. The pre-feeding process of the card will be described below in detail.

In Step S204, the controller 50 determines whether it has been determined that it is too difficult to introduce the card by the above described pre-feeding process of the card. In a case where it has been determined that it is possible to introduce the card, the controller 50 proceeds to Step S205. Meanwhile, in a case where it has been determined that it is too difficult to introduce the card, the controller 50 proceeds to Step S212.

In Step S205, the controller 50 sets the card reading-condition as a reading-condition for controlling the image reading unit 30. Step S205 is an example of a first setting process.

In Step S206, the controller 50 controls the stepping motor, thereby driving the conveyer 20 such that conveyance of the card C starts.

In Step S207, the controller 50 outputs a predetermined number of pulses to the stepping motor from the start time of the control on the stepping motor. After that, the controller 50 controls the image reading unit 30 such that reading of the card C starts. The predetermined number is the number of pulses required for the leading end of the card C to move from a position where the leading end is detected by the rear sensor 44 to a position where the leading end is read by the image reading unit 30. At this time, the controller 50 controls the image reading unit 30 such that the image reading unit 30 reads the card C according to the reading-condition set in Step S205.

In Step S208, the controller 50 waits for the rear sensor 44 to be turned off. When the rear sensor 44 is turned off, the controller 50 proceeds to Step S209.

In Step S209, the controller 50 outputs a predetermined number of pulses to the stepping motor from the turn-off time of the rear sensor 44. After that the controller 50 controls the image reading unit 30 such that the image reading unit 30 stops the reading of the sheet. The predetermined number is the number of pulses required for the rear end of the card C to move from a position where the rear end is detected by the rear sensor 44 to a position where the rear end is read by the image reading unit 30.

In Step S210, the controller 50 determines whether the conveyance of the sheet has been completed. In a case where the conveyance has been completed, the controller 50 proceeds to Step S211. The controller 50 determines whether the conveyance of the sheet has been completed, for example, according to whether a number of pulses required for the rear end of the card C to move from the location where the rear end is read by the image reading unit 30 to a position where the rear end is not nipped by the conveying roller 25 and the driven roller 26 have been output.

In Step S211, the controller 50 finishes the control on the stepping motor, thereby stopping the driving of the conveyer 20 such that the conveyance of the card C is stopped.

In Step S212, the controller 50 controls the operation unit 15 such that the operation unit 15 displays a message. The message to be displayed is different depending on which of Steps S201, S202, and S204 has caused Step S212 to be performed. For example, in a case where it is determined in Step S201 that there is a plain sheet, the controller 50 performs control such that the operation unit 15 displays a message representing that there is a plain sheet M introduced in the second introducing part 12. In a case where it is determined in Step S202 that there is no card, the controller 50 performs control such that the operation unit 15 displays a message representing that there is no card C introduced in the first introducing opening 16a. In a case where it is determined in Step S204 that it is too difficult to introduce a card, the controller 50 performs control such that the operation unit 15 displays a message representing that it is too difficult to introduce the card.

(4-2) Pre-Feeding Process of Card

Figure 9:
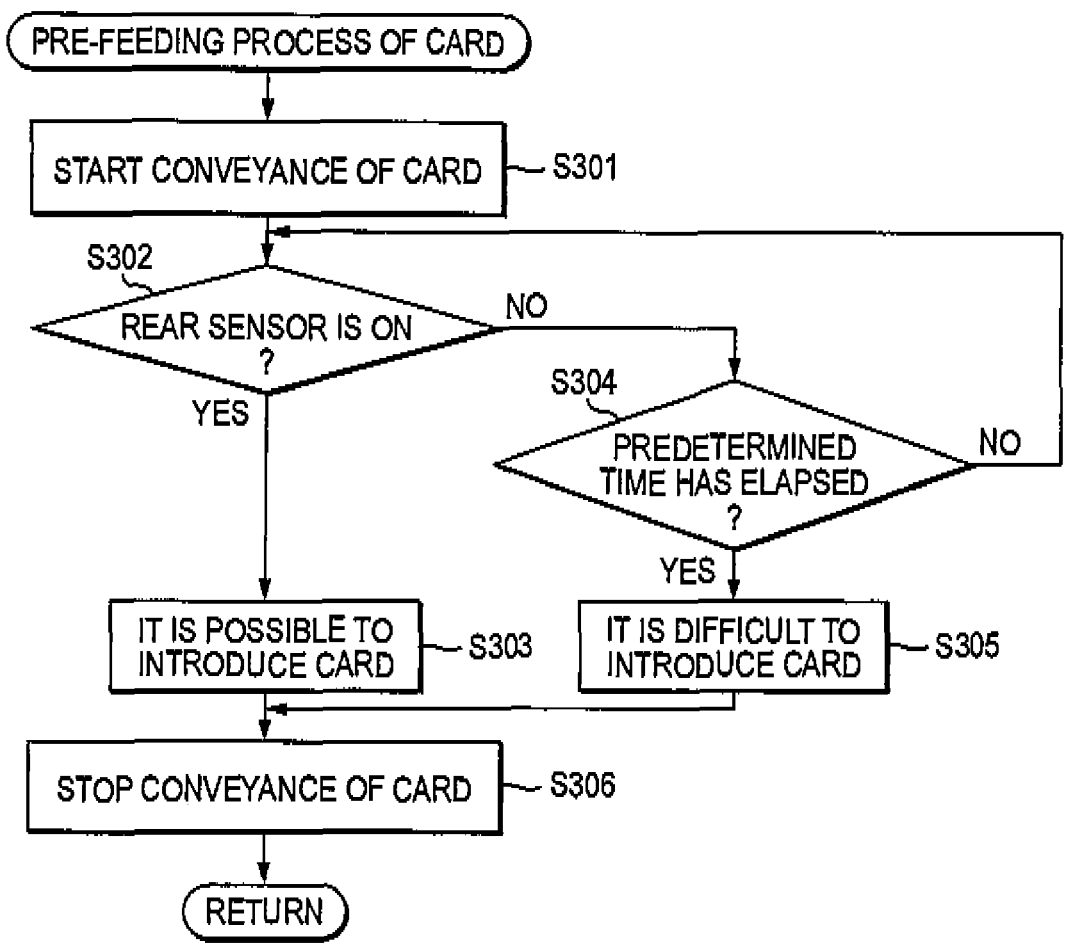
FIG. 9 is a flow chart illustrating a pre-feeding process of a card.

Hereinafter, the pre-feeding process of a card which is performed in Step S203 will be described with reference to FIG. 9.

In Step S301, the controller 50 controls the stepping motor, thereby driving the conveyer 20 such that conveyance of the card C starts.

In Step S302, the controller 50 determines whether the card C has been detected by the rear sensor 44. As described above, in a case where push-in of the card C is not sufficient, the card C is not nipped by the conveying roller 23 and the driven roller 24. In this case, even when a predetermined time elapses, the card C is not detected by the rear sensor 44. In a case where the card C has been detected, the controller 50 proceeds to Step S303. Meanwhile, in a case where the card C has not been detected, the controller 50 proceeds to Step S304.

In Step S303, the controller 50 stores information representing that it is possible to introduce the card, in the RAM 50c.

In Step S304, the controller 50 determines whether the above described predetermined time has elapsed from the start time of the conveyance in Step S301. In a case where the predetermined time has not elapsed, the controller 50 returns to Step S302. Meanwhile, in a case where the predetermined time has elapsed, the controller 50 proceeds to Step S305.

In Step S305, the controller 50 stores information representing that it is too difficult to introduce the card, in the RAM 50c.

In Step S306, the controller 50 finishes the control on the stepping motor, thereby stopping the driving of the conveyer 20 such that the conveyance of the card C is stopped.

(4-3) Process in Case Where Cover is in Open State

Hereinafter, the process in the case where the cover is in the open state will be described with reference to FIG. 10.

In Step S401, the controller 50 performs detection of existence of a plain sheet M by the plain sheet sensor 43. In a case where there is no plain sheet M, the controller 50 proceeds to Step S402. Meanwhile, in a case where there is a plain sheet M (the case of the third pattern), the controller 50 proceeds to Step S404.

In Step S402, the controller 50 determines whether a predetermined time or more has elapsed from the reception time of a reading instruction. In a case where the predetermined time or more has not elapsed, the controller 50 returns to Step S101 shown in FIG. 7. Meanwhile, in a case where the predetermined time or more has elapsed (the case of the first pattern), the controller 50 proceeds to Step S403. The predetermined time is, for example, about 3 sec to 5 sec.

In Step S403, the controller 50 performs control such that the operation unit 15 displays a message representing that any plain sheet has not been introduced and then stops the reading.

In Step S404, the controller 50 sets a plain-sheet reading-condition as a reading-condition for control on the image reading unit 30. The plain-sheet reading-condition is a reading-condition set by the operation of the user on the operation unit 15 before inputting of the reading instruction.

In Step S405, the controller 50 controls the stepping motor, thereby driving the conveyer 20 such that conveyance of the plain sheet M starts.

In Step S406, the controller 50 waits for the rear sensor 44 to be turned on. When the rear sensor 44 is turned on, the controller 50 proceeds to Step S407.

In Step S407, similarly in Step S207, the controller 50 controls the image reading unit 30 such that reading of the plain sheet M starts. At this time the controller 50 controls the image reading unit 30 such that the image reading unit 30 reads the plain sheet M according to the reading-condition set in Step S404.

In Step S408, the controller 50 waits for the rear sensor 44 to be turned off. When the rear sensor 44 is turned off, the controller 50 proceeds to Step S409.

In Step S409, when the plain sheet M is conveyed by the above described predetermined distance after the rear sensor 44 was turned off, the controller 50 controls the image reading unit 30 such that the image reading unit 30 stops the reading of the sheet.

In Step S410, similarly in Step S210, the controller 50 determines whether the conveyance of the sheet has been completed. In a case where the conveyance has been completed, the controller 50 proceeds to Step S411.

In Step S411, the controller 50 controls the conveyer 20 such that the conveyer 20 stops the conveyance.

(5) Effects of Illustrative Embodiment

According to the image reading apparatus 1 of the first illustrative embodiment described above, in the case where the cover 13 is in the closed state, the first introducing part 16 is opened and the second introducing part 12 is covered by the cover 13. That is, in the case where the cover 13 is in the closed state, it is possible to determine that it is too difficult to perform reading of a plain sheet M. In this case, according to the image reading apparatus 1, the card reading-condition is automatically set as a reading-condition. Accordingly, at least in the case where the cover 13 is in the closed state, the user does not need to set a reading-condition according to the kind of a sheet.

Therefore, according to the image reading apparatus 1, it is possible to set an image reading-condition according to the kind of a sheet in the image processing apparatus 1 having the plurality of introducing parts to introduce different kinds of sheets, while suppressing the trouble of the user.

Also, according to the image reading apparatus 1, since the cover sensor 41 is provided, it is possible to detect the open-and-closed state of the cover 13.

Further, according to the image reading apparatus 1, in a case where the cover 13 is the open state, the cover 13 opens the first introducing part 16 and also opens the second introducing part 12. In the case where the cover 13 is in the open state, since there are not only a possibility that a card C will be introduced but also a possibility that a plain sheet M will be introduced, it is too difficult to determine an image reading-condition according to the kind of a sheet only on the basis of the open-and-closed state of the cover 13. However, at least with respect to the case where the cover 13 is in the closed state, since it is possible to determine that a possibility that the user wants image reading of a plain sheet M is low, the card reading-condition is set. Therefore, it is possible to set an image reading-condition according to the kind of a sheet while suppressing the trouble of the user.

Also, according to the image reading apparatus 1, in the case of the fifth pattern, when it is possible to introduce a card, reading of a card C automatically starts. Therefore, it is possible to reduce the trouble of the user.

Further, according to the image reading apparatus 1, when the user operates the operation unit 15 so as to input a reading instruction, detection of the open-and-closed state of the cover 13 is performed by the cover sensor 41, and also detection of existence of a card C is also performed by the card sensor 42. Then, when the cover 13 is in the closed state and there is a card C (the case of the fifth pattern), the first setting process is performed. Meanwhile, in a case where the cover 13 is in the closed state and there is a card C, since a possibility that image reading using the card C will be performed is high, the card reading-condition is set, so that it is possible to more surely suppress the trouble of the user.

Furthermore, according to the image reading apparatus 1, when the user operates the operation unit 15 so as to input a reading instruction, detection of the open-and-closed state of the cover 13 is performed by the cover sensor 41. Then, when the cover 13 is in the closed state, detection of existence of a card C is performed by the card sensor 42 (the second pattern and the fifth pattern). Meanwhile, in a case where the cover 13 is in the open state, detection of existence of a card C by the card sensor 42 is not performed (the first pattern and the third pattern). In the case where the cover 13 is in the open state, a possibility that reading of a card C will be performed is low. That is, the need to detect existence of a card C is low. According to the image reading apparatus 1, in the case where the cover 13 is in the open state, since detection of existence of a card C is not performed, it is possible to suppress useless detection.

Also, according to the image reading apparatus 1, when the user operates the operation unit 15 so as to input a reading instruction, detection of existence of a plain sheet M is performed by the plain sheet sensor 43. Then, in a case where the cover 13 is in the closed state and there is a card C and where there is no plain sheet M (the case of the fifth pattern), the first setting process is performed. In a case where the cover 13 is in the closed state and there is a card C and where there is no plain sheet M, since a possibility that reading of the card C will be performed is high, the card reading-condition is set, whereby it is possible to more surly suppress the trouble of the user.

Further, according to the image reading apparatus 1, in a case where the cover 13 is in the open state and there is no plain sheet M (in the case of the first pattern), in Step S402, the controller 50 determines whether the predetermined time or more has elapsed after the user operated the operation unit 15 so as to input the reading instruction. In a case where the predetermined time or more has not elapsed, the controller 50 returns to Step S101 to perform detection of the open-and-closed state of the cover 13 by the cover sensor 41 again. Meanwhile, in a case where the predetermined time or more has elapsed (a case of "YES" in Step S402), reading is not performed.

For example, in a case where the user wants to perform reading of a card C, the user may forget to close the cover 13 and input a reading instruction. In this case, immediately after issuing a request for performing image processing, the user will notice the open state and will close the cover 13.

According to the image reading apparatus 1, even when the user forgets to close the cover 13 and inputs a reading instruction in the open state, in a case where there is no plain sheet, in Step S403, a message representing that there is no introduced plain sheet is not immediately displayed, but after the predetermined time elapses, the corresponding message is displayed. Therefore, even when the user inputs a reading instruction in the open state, when the user closes the cover 13 before the predetermined time elapses, it is possible to perform reading of the card C.

Also according to the image reading apparatus 1, the image processor is the image reading unit 30 for reading sheets and generating image data. According to the image reading apparatus 1, in a case of performing image reading to read a sheet and generate image data, it is possible to set an image reading-condition according to the kind of the sheet while suppressing the trouble of the user.

<Second Illustrative Embodiment>

Figure 11:
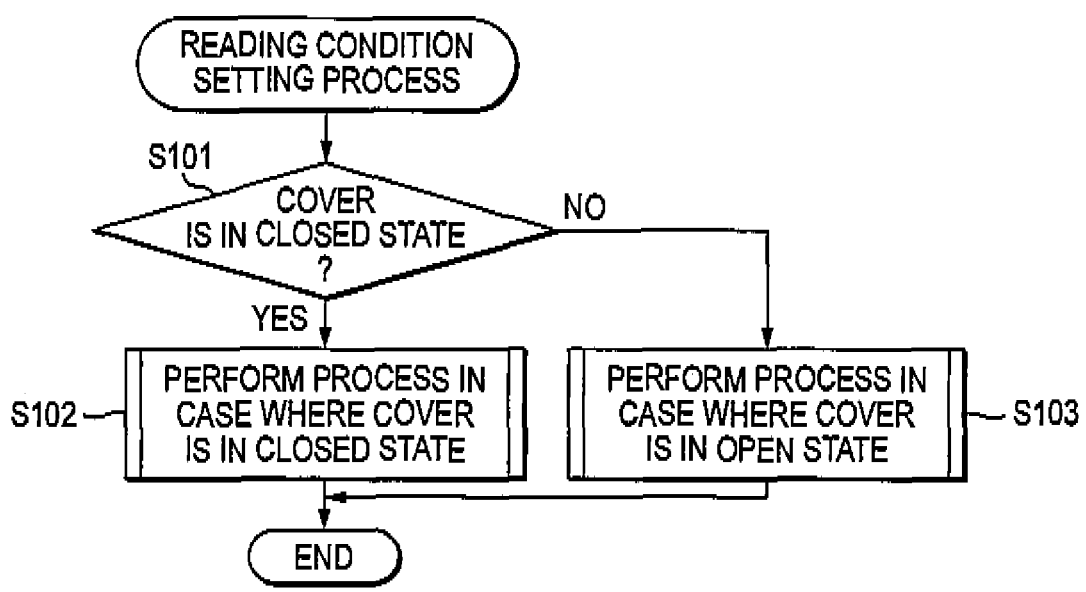
FIG. 11 is a flow chart illustrating a reading-condition setting process according to a second illustrative embodiment.

Hereinafter, a second illustrative embodiment will be described with reference to FIGS. 11 to 13.

In the second illustrative embodiment, not only in a case of reading a plain sheet M but also in a case of reading a card C, the user operates the operation unit 15 so as to set a reading-condition, before inputting a reading instruction. In this case, before the user issues an instruction to read a sheet, the controller 50 according to the second illustrative embodiment determines whether reading of a plain sheet M is to be performed or reading of a card C is to be performed, similarly in the first illustrative embodiment. Then, in a case where it is determined that reading of a card C is to be performed, the controller 50 displays the card reading-condition as a default reading-condition on the display operation panel 120. Meanwhile, in a case where it is determined that reading of a plain sheet M is to be performed, the controller 50 displays the plain-sheet reading-condition as a default reading-condition on the operation unit 15.

Here, the plain-sheet reading-condition means a default reading-condition set appropriately. The plain-sheet reading-condition is not necessarily limited to a reading-condition appropriate for reading a plain sheet M.

Then, when the user inputs an instruction to read the sheet, the controller 50 controls the image reading unit 30 such that the image reading unit 30 reads the sheet under the reading-condition set by the user.

(1) Reading-Condition Setting Process

A reading-condition setting process according to the second illustrative embodiment will be described with reference to FIG. 11. The reading-condition setting process is performed repeatedly at predetermined time intervals while power is applied to the image reading apparatus 1. The steps of the flow shown in FIG. 11 are similar to as those of the flow shown in FIG. 7, and thus they are denoted by the same reference symbols and the detailed description will be omitted.

(1-1) Process in Case Where Cover is in Closed State

Hereinafter, a process according to the second illustrative embodiment in the case where the cover is in the closed state will be described with reference to FIG. 12.

Figure 8:
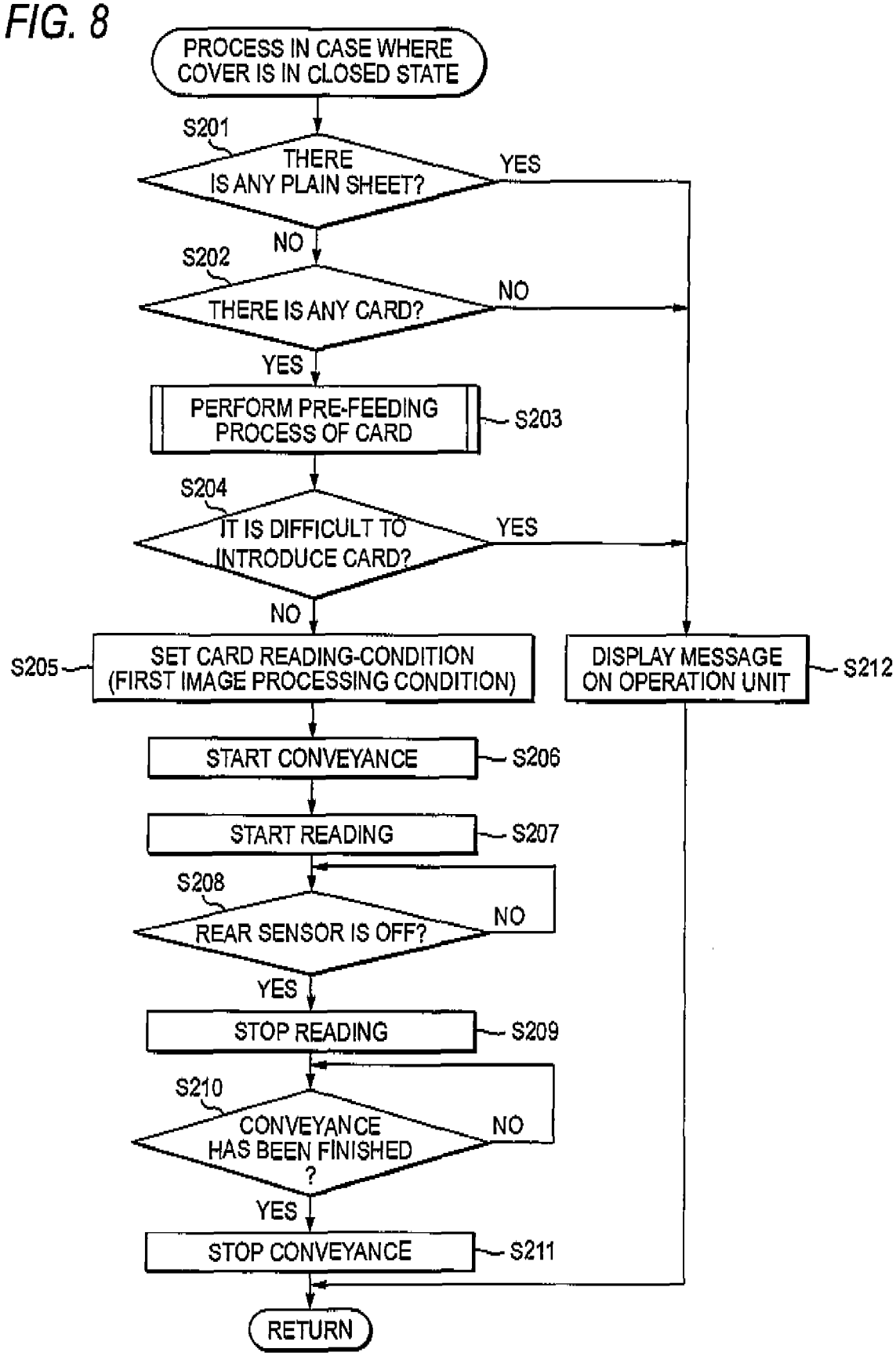
FIG. 8 is a flow chart illustrating a process in the case where the cover is in an open state.
Figure 12:
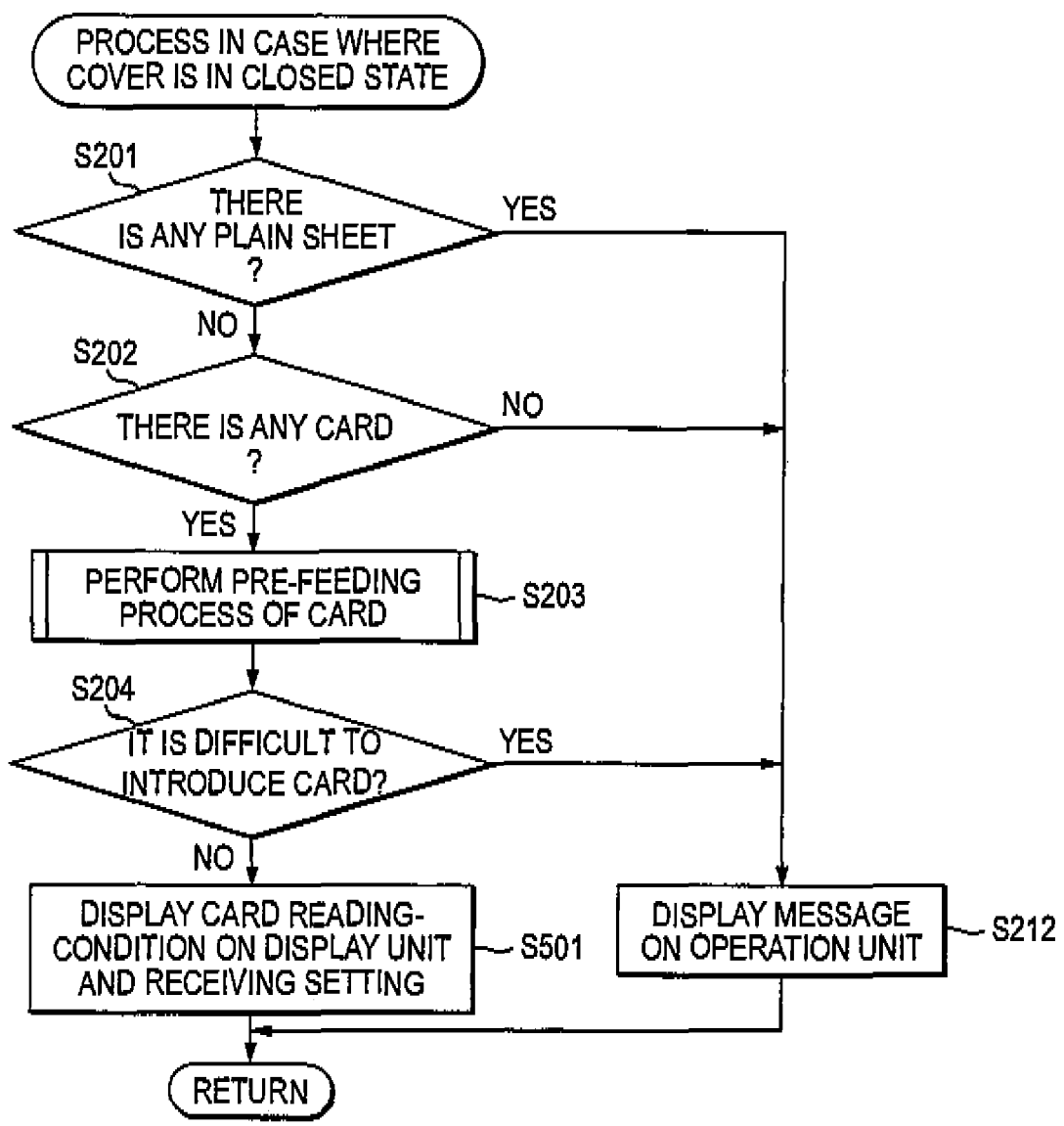
FIG. 12 is a flow chart illustrating a process in a case where the cover is in a closed state.

In FIG. 12, Steps S201 to S204, and S212 are similar to processes shown by the same reference symbols in FIG. 8, and thus the detailed description will be omitted.

In Step S501, the controller 50 controls the operation unit 15 to display the card reading-condition and receives a change of the reading-condition from the user.

The user can operate the operation unit 15 so as to change the displayed card reading-condition. Thereafter, when the user operates the operation unit 15 so as to issue a reading instruction, the controller 50 performs a reading process of reading a card C under the changed card reading-condition. The process of reading the card C is similar to Steps S206 to S211, and thus the detailed description will be omitted.

(1-2) Process in Case Where Cover is in Open State

Hereinafter, a process according to the second illustrative embodiment in the case where the cover is in the open state will be described with reference to FIG. 13.

Figure 10:
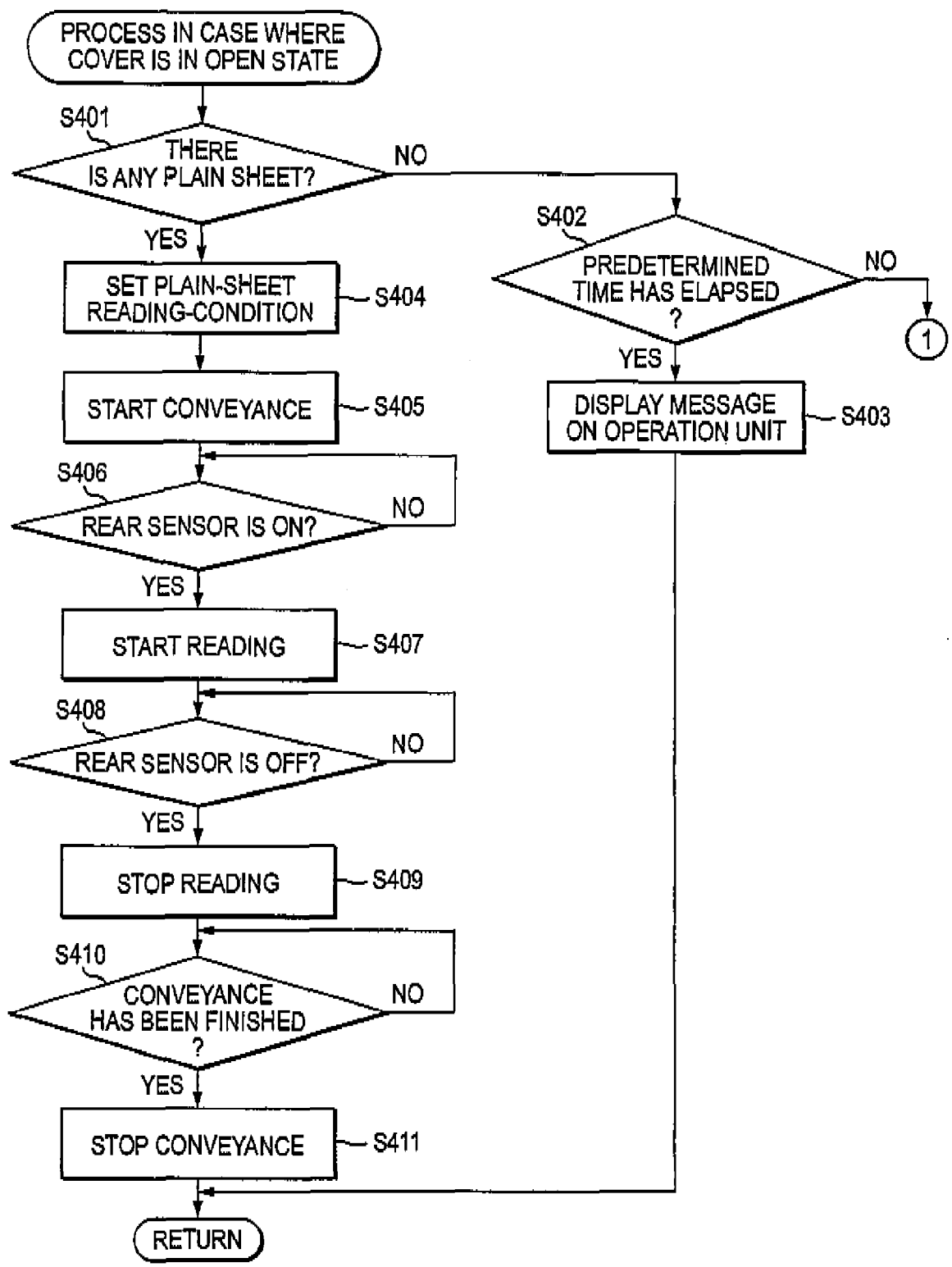
FIG. 10 is a flow chart illustrating a process in a case where the cover is in the open state.
Figure 13:
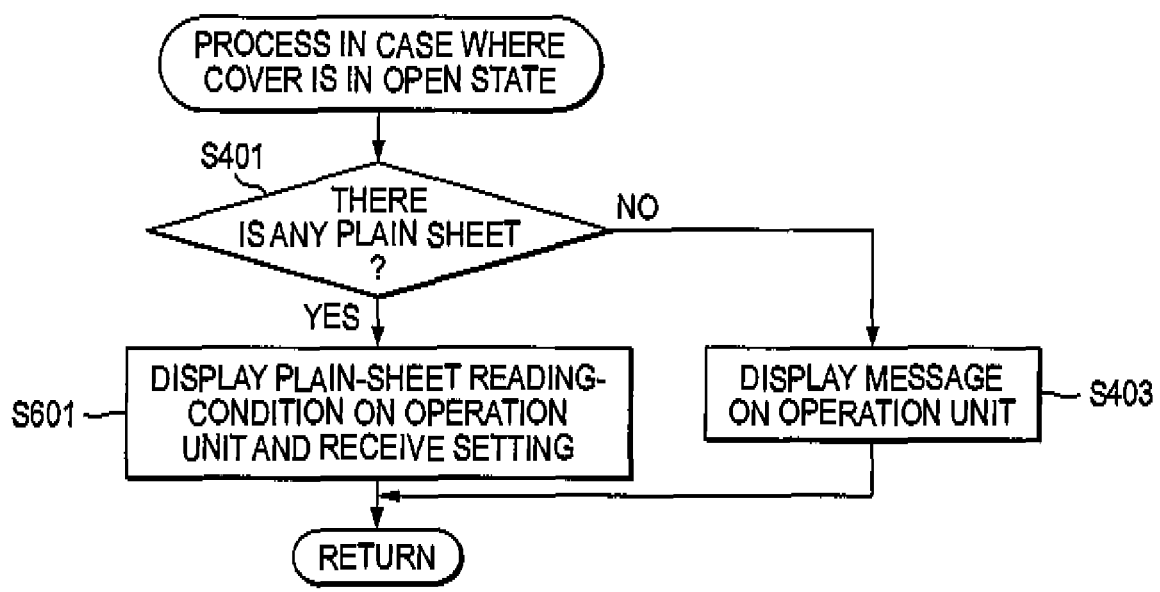
FIG. 13 is a flow chart illustrating a process in a case where the cover is in the open state.

In FIG. 13, Steps S401 and S403 are similar to those of the process shown by the same reference symbols in FIG. 10, and the detailed description will be omitted.

In Step S601, the controller 50 controls the operation unit 15 such that the operation unit 15 displays the above described plain-sheet reading-condition.

The user can operate the operation unit 15 so as to change the displayed plain-sheet reading-condition. Thereafter, when the user operates the operation unit 15 so as to issue a reading instruction, the controller 50 performs a reading process of reading a plain sheet M under the changed plain-sheet reading-condition. The process of reading the plain sheet M is similar to Steps S405 to S411, and the detailed description will be omitted.

(3) Effects of Illustrative Embodiment

According to the image reading apparatus 1 of the second illustrative embodiment described above second illustrative embodiment, in a case where the cover 13 is in the closed state, the card reading-condition is displayed on the display unit. Therefore, in a case where the user wants to set the card reading-condition and perform image reading, the user does not need to set the card reading-condition by self. Therefore, according to the image reading apparatus 1, it is possible to set an image reading-condition according to the kind of a sheet while suppressing the trouble of the user.

<Other Illustrative Embodiments>

This disclosure is not limited to the illustrative embodiments described above with reference to the drawings. For example, the following illustrative embodiments are also included in the technical scope.

(1) In the above described first illustrative embodiment, an example of the card reading-condition has been described. However, the card reading-condition is not limited to that described in the first illustrative embodiment, but can be appropriately set. For example, the card reading-condition may be a only condition in which the item "READ SIZE" has the option value "CARD SIZE".

In this case, since the option values of read option items other than the item "READ SIZE" are not automatically set, the user needs to set the option values of the corresponding read option items in Step S205. Even in this case, at least with respect to the item "READ SIZE", the option value is automatically set. Therefore, it is possible to reduce the trouble of the user.

Also, even in a case of using the card reading-condition shown in the first illustrative embodiment, in Step S205, the controller 50 may control the operation unit 15 such that the operation unit 15 displays the card reading-condition, and the controller 50 may receive a change of the option values from the user.

(2) In the above described first illustrative embodiment, a case has been described as an example, where when the user operates the operation unit 15 so as to issue an instruction to read a sheet, detection of the open-and-closed state of the cover is performed in Step S101 without waiting for the predetermined time to elapse. In contrast to this, in the above described first illustrative embodiment, when the user operates the operation unit 15 so as to issue a reading instruction, detection of the open-and-closed state of the cover may be performed after the predetermined time elapses, in Step S101. The predetermined time is, for example, about 3 sec to 5 sec.

For example, in a case where the user wants to perform reading of a card C, the user may forget to close the cover 13 and input a reading instruction in the open state. In this case, immediately after inputting the reading instruction, the user could notice the open state and close the cover 13.

According to the above described configuration, when the predetermined time elapses after the reading instruction is input, the image reading apparatus 1 performs detection of the open-and-closed state of the cover 13 by the cover sensor 41. Therefore, when the user closes the cover before the cover sensor performs detection even when the user issues a request in open state, it is possible to perform reading of the card C.

(3) In the above described first illustrative embodiment, a case of setting a card reading-condition stored in the ROM 50b as a reading-condition in Step S205 when the cover 13 is in the closed state has been described as an example. In contrast to this, in Step S205, the controller 50 may transmit information representing the closed state of the cover 13 to an external apparatus such as a PC connected to the image reading apparatus 1 such that communication is possible, and the controller 50 may receive a card reading-condition as a response to that information and set the received card reading-condition. According to this configuration, it is possible to set the card reading-condition by the external apparatus. The process of transmitting the information representing the closed state of the cover 13 to the external apparatus is an example of a transmitting process. Also, the process of receiving the card reading-condition from the external apparatus is an example of a receiving process.

(4) In the above described first illustrative embodiment, a case of setting the reading-condition set in Step S404 by the user, as the plain-sheet reading-condition when the cover 13 is in the open state and there is a plain sheet M has been described as an example. In contrast to this, in the case where the cover 13 is in the open state and there is a plain sheet M, a plain-sheet reading-condition stored in advance may be automatically set and reading of the plain sheet M may be performed. According to this configuration, even when the cover 13 is in the open state, it is possible to suppress the trouble of the user. The process of automatically setting the plain-sheet reading-condition when the cover 13 is in the open state is an example of a second setting process.

(5) In the above described illustrative embodiments, a case has been described as an example, where, in a case where the cover 13 is the open state, the cover 13 opens the first introducing part 16 and also opens the second introducing part 12. In contrast to this, in the case where the cover 13 is the open state, the cover 13 may cover the first introducing part 16 and open the second introducing part 12. In this configuration, the controller 50 may perform detection of existence of a card C by the card sensor 42 and perform the first setting process if there is a card C.

In a case where the cover 13 is the open state and where the cover 13 covers the first introducing part 16 and opens the second introducing part 12, it is possible to use the card sensor 42 to automatically set an image processing condition according to the kind of a sheet while reducing the time and effort of the user. The reason is that detection of a card C is performed by the card sensor 42 when only the first introducing part 16 of the two introducing parts is in the open state and there is a high possibility that image processing using a card C will be performed.

(6) In the above described illustrative embodiments, a case has been described as an example, where detection of existence a card C by the card sensor 42 is not performed when the cover 13 is in the open state (for example, the first pattern and the third pattern). In contrast to this, even when the cover 13 is in the open state, detection of existence of a card C may be performed.

Then, as the detection result, when there is a card C, the controller 50 may control the operation unit 15 such that the operation unit 15 displays a message "PLEASE CLOSE THE COVER". Meanwhile, when there is a card C and there is a plain sheet M, the controller 50 may control the operation unit 15 such that the operation unit 15 displays a message "PLEASE REMOVE THE PLAIN SHEET AND CLOSE THE COVER".

(7) In the above described first illustrative embodiment, in the case where the cover is in the closed state shown in FIG. 8, Step S201 is performed. However, Step S201 may be omitted.

(8) In the above described first illustrative embodiment, in the case where the cover is in the open state shown in FIG. 10, Step S402 is performed. However, Step S402 may be omitted.

(9) In the above described second illustrative embodiment, in the case where the cover is in the closed state, in the process shown in FIG. 12, Steps S203, S204, and S501 are performed after determinations of Steps S201 and S202. However, in the case where the cover is in the closed state, Steps S203, S204, and S501 may be performed, without performing determinations of Steps S201 and S202.

(10) In the above described illustrative embodiments, the image reading apparatus has been described as an example of the image processing apparatus. However, the image processing apparatus is not limited to the image reading apparatus. For example, the image processing apparatus may be an image forming apparatus (so-called printer). In this case, an image forming unit included in the image forming apparatus is an example of the image processor. Alternatively, the image processing apparatus may be a so-called multi-function apparatus having a variety of functions such as a scanner function, a facsimile function, a print function, and a copy function.

(11) In the above described illustrative embodiments, a case where the controller 50 has one CPU 50a has been described as an example. In contrast to this, the controller 50 may be configured by a plurality of CPUs 50a, or may be configured by an ASIC, or may be configured by a combination of CPUs 50a and an ASIC.

What is claimed is:

1. An image reading apparatus comprising:
   a housing having a first opening and a second opening;
   a conveyer configured to convey a first sheet passed through the first opening and a second sheet passed through the second opening;
   a reading unit configured to read an image on the first sheet and the second sheet conveyed by the conveyer;
   a cover disposed on the housing, the cover being configured to rotate between an open state and a closed state, wherein when the cover is in the open state, the first opening is opened and the second opening is opened, and wherein when the cover is in the closed state, the first opening is opened and the second opening is closed;
   a controller configured to set a first image processing condition corresponding to the first sheet and a second image processing condition corresponding to the second sheet,
   wherein when the controller determines that the cover is in the closed state, the controller sets the first image processing condition and controls the reading unit to read the image on the first sheet, based on the first image processing condition.

2. The image reading apparatus according to claim 1, further comprising:
   a cover sensor configured to detect an open-and-closed state of the cover,
   wherein the controller detects the open-and-closed state of the cover by the cover sensor.

3. The image reading apparatus according to claim 2, further comprising:
   a request receiver configured to receive a request to perform the image reading,
   wherein when the request is received by the request receiver, the controller performs detection of the open-and-closed state of the cover by the cover sensor and the first setting process when the cover is in the closed state, and then the controller controls the reading unit such that the reading unit performs the image processing according to the first image processing condition set by the first setting process.

4. The image reading apparatus according to claim 3,
   wherein in a case where the cover is in the open state and there is no second-type sheet, the controller determines whether a predetermined time or more has elapsed after the reception of the request by the request receiver,
   wherein in a case where the predetermined time or more has not elapsed, the controller performs detection of the open-and-closed state of the cover by the cover sensor again, and
   wherein in a case where the predetermined time or more has elapsed, the controller does not perform the image reading.

5. The image reading apparatus according to claim 3,
   wherein when the request is received by the request receiver, after a predetermined time elapses after the reception of the corresponding request, the controller performs detection of the open-and-closed state of the cover by the cover sensor.

6. The image reading apparatus according to claim 2, further comprising:
   a first sheet sensor configured to detect existence a first-type sheet introduced in the first opening,
   wherein the controller performs detection of the open-and-closed state of the cover by the cover sensor and performs detection of existence of the first-type sheet by the first sheet sensor, and wherein in a case where the cover is in the closed state and there is the first-type sheet, the controller performs the first setting process.

7. The image reading apparatus according to claim 6,
   wherein the controller performs detection of the open-and-closed state of the cover by the cover sensor,
   wherein in a case where the cower is in the closed state, the controller performs detection of existence of the first-type sheet by the first sheet sensor, and
   wherein in a case when the cover is in the open state, the controller does not perform detection of existence of the first-type sheet by the first sheet sensor.

8. The image reading apparatus according to claim 7, further comprising:
   a second sheet sensor configured to detect existence a second-type sheet introduced in the second opening,
   wherein the controller performs detection of existence of a second-type sheet by the second sheet sensor, and
   wherein in a case where the cover is in the closed state and where there is a first-type sheet and there is no second-type sheet, the controller performs the first setting process.

9. The image reading apparatus according to claim 1, wherein the controller performs:
   transmitting information representing the closed state of the cover to an external apparatus in a case where the cover is in the closed state; and
   receiving the first image processing condition from the external apparatus as a response to the information, and
   wherein in the first, setting process, the controller sets the first image processing condition received by the receiving process.

10. The image reading apparatus according to claim 1, further comprising;
    a display configured to display an image processing condition; and
    a change receiver configured to receive a change of the image processing condition displayed on the display unit, wherein in a case where the cover in the closed state, in the first setting process, the controller controls the display unit such that the display unit displays the first, image processing condition.

11. The image reading apparatus according to claim 1, wherein in a case where the cover in the open state, the controller performs a second setting process to set a second image processing condition corresponding to image processing according to the second-type sheet.

12. The image reading apparatus according to claim 1, further comprising:
    a first sheet sensor configured to detect existence of the first-type sheet introduced in the first opening,
    wherein, in the open state, the cover covers the first opening and opens the second opening,
    wherein the controller performs detection of existence of the first-type sheet by the first sheet sensor, and
    wherein in a case where there is the first-type sheet, the controller performs the first setting process.

13. The image reading apparatus according to claim 1, wherein the housing further comprises a first surface and a second surface,
    wherein the first surface has the first opening, and
    wherein the second surface has the second opening.

* * * * *